Patented July 30, 1940

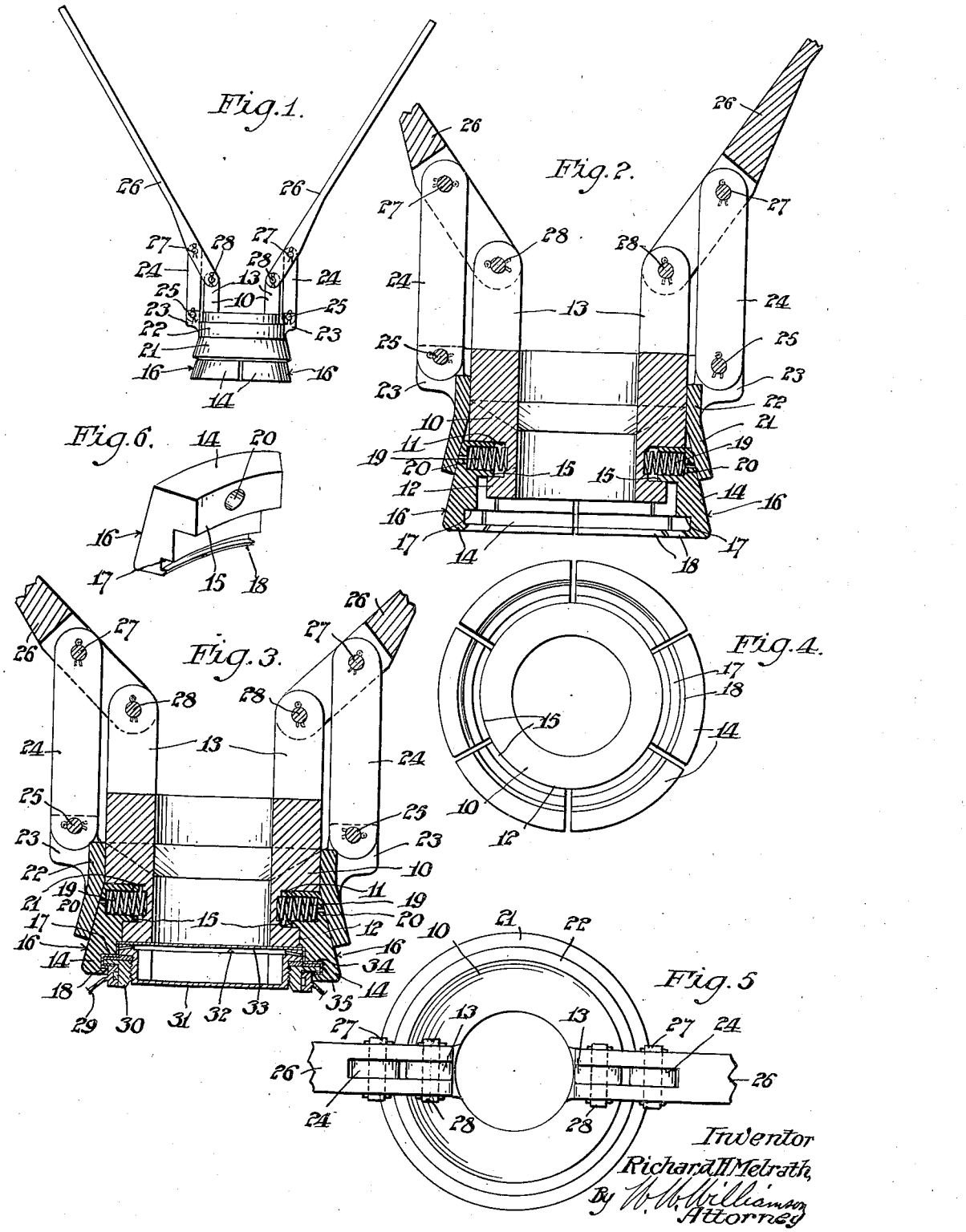

2,209,892

UNITED STATES PATENT OFFICE 2,209,892

CLOSING TOOL

Richard H. Melrath, Drexel Hill, Pa., assignor, by mesne assignments, to American Flange & Manufacturing Co., Inc., New York, N. Y., a corporation of Illinois Application March 30, 1936, Serial No. 71,631

5 Claims. (Cl. 113—18)

My invention relates to a new and useful closing tool for the sealing caps of container bungs such as those used in connection with metal drums or barrels, and has for one of its objects to produce an exceedingly simple and effective tool of this character which will be strong and durable.

Another object of this invention is to produce a closing tool in which the jaws are moved toward their closed positions, against the actions of springs, by lever handles through the medium of a cam sleeve, said springs causing the jaws to open and the other parts to return to their neutral positions.

A further object of the present invention is to construct a closing tool consisting of a cylindrical body having an exterior circumferential groove, several jaws provided with extensions slidably mounted in the groove of the body said jaws being urged outwardly by springs and forced inwardly by a cam sleeve which is moved longitudinally over the body and jaws by lever handles, said cam sleeves assisting in holding the jaws in place.

With these and other objects in view, this invention consists of the details of construction and combination of elements hereinafter set forth and then specifically designated by the claims.

In order that those skilled in the art to which this invention appertains may understand how to make and use the same, I will describe its construction in detail, referring by numerals to the accompanying drawing, in which:

Fig. 1 is a side elevation of a closing tool constructed in accordance with my invention.

Fig. 2 is an enlarged vertical section thereof just forward of the lever handles with the parts in a neutral or open position.

Fig. 3 is a similar view in a closed position and illustrating the manner of attaching a sealing cap over a bung and to a barrel or drum flange.

Fig. 4 is a bottom end or plan view of the tool without the operating mechanism.

Fig. 5 is a top plan view of the tool, and

Fig. 6 is a perspective view of one of the jaws.

In carrying out my invention as herein embodied 10 represents a cylindrical body having an exterior circumferential groove 11 adjacent its lower end and that portion of said body below the groove is of less diameter than the upper part thereby providing a clamp or anvil 12 of substantially the same size as the sealing caps with which it is to be used. In order to lighten the weight of the tool, the upper end of the body bore is larger in diameter than the lower end. A pair of posts 13 project upwardly from the top of the body and are located diametrically opposite each other. These posts are preferably formed integral with the body although no such limitation is intended.

A plurality of jaws 14, arcuate in plan, surround the body and are mounted on said body by the extensions 15, which protrude from the inner faces at the tops thereof and project into the groove 11 for radial sliding movement. The ends of the jaws converge toward the inner faces thereof so that when the several jaws are in closed positions a true circle is produced with the faces of all jaws flush. In effect each jaw is a segment of a cone whereby the outer face in addition to being convexly curved longitudinally is also inclined or tapered inwardly and upwardly to provide what I term a cam surface 16. Each jaw is also cut away to form a shoulder 17 adapted to engage a preformed ledge on a sealing cap, and a lip 18 to turn the skirt of said cap under the rim of a barrel or drum flange and thereby securely fasten said sealing cap over a bung and to the flange.

The jaws 14 are urged outwardly by springs 19, preferably one for each jaw, having their outer ends set in sockets 20 formed in said jaws, more particularly in the extensions 15, and their inner ends engaging the body within the groove 11. Said jaws 14 are simultaneously forced inward against the action of said springs by the flared cuff 21 of the cam sleeve 22 which is slidably mounted on the upper part of the body 10 and the taper of the cuff 21 is the same as the outer faces of the jaws 14. It might be well to state at this point that the taper of said jaws and cuff is such that the force exerted by the springs will, through the medium of the jaws, cause the cam sleeve to move to a retracted position as shown in Figs. 1 and 2. The cuff of the cam sleeve is never disengaged from the jaws, except to dismantle the tool, and therefore retains said jaws on the body.

A pair of ears 23 are carried by the cam sleeve 22 and are located at diametrically opposite positions to be in alignment with the posts 13. To these ears are pivoted the lower ends of links 24 by any suitable means 25 and the upper ends of said links are pivoted adjacent the inner ends of the lever handles 26, within bifurcated portions thereof, by the use of convenient means 27 and said lever handles 26 are pivoted at their inner ends to the posts 13 by means 28.

In Fig. 3 I have shown a portion of a barrel or drum wall 29 with a flange element 30 secured thereto and a bung 31 screwed into said flange element. A sealing cap 32 is placed over the bung 31 and includes a crown 33 enclosing the outer or exposed part of said bung, a ledge 34 that rests on the exposed face of the flange element and a skirt 35 to be turned under the rim of said flange element.

The operation is as follows: With the jaws of the tool expanded or open, as shown in Fig. 2, said tool is placed over the sealing cap until the clamp or anvil 12 rests on the crown of the sealing cap which latter has been positioned over the bung, and so that the shoulder 17 rests on the ledge 34 of said cap. The lever handles 26 are then moved apart to transmit motion through the links 24 to the cam sleeve 22 causing the latter to slide along the tool body 10. The sliding of the cam sleeve will move the cam cuff 21 over the jaws 14 to contract or close said jaws along radial lines whereby the lips 18 will draw the edge of the sealing cap skirt 35 under the rim of the flange element 30 thus fixing the sealing cap in place. This contracting movement, as seen from Fig. 3, is limited by the inner faces of the jaws 14 engaging the extending reduced portion 12, this portion acting to positively stop the jaws after a predetermined movement, thus protecting the jaw parts against undue strain as well preventing the exertion of pressure on the closure beyond a certain point. Due to the engagement of the clamping portion 12 with the crown and the shoulder 17 with the ledge of the cap at the time the edge of the skirt is closed or turned in, the walls of the cap are retained in a smooth condition and wrinkling is positively prevented. As the jaws of the tool are closed or contracted, the tension of the springs will be increased so that when the lever handles are released said springs will urge said jaws outward and cause the cam sleeve to retract thereby returning all parts to a neutral position ready for subsequent operations.

Of course I do not wish to be limited to the exact details of construction herein shown and described as these may be varied within the scope of the appended claims without departing from the spirit of my invention.

Having thus fully described my invention what I claim as new and useful is:

1. A tool for applying seal caps to container closures comprising a tubular mounting member having a reduced portion, jaw members surrounding said mounting member, and means for mounting said jaw members on said reduced portion of mounting member for radial movement with respect to the axis thereof, said means comprising a peripheral slot having rigid parallel side walls formed in said reduced portion and inwardly extending ledges on said jaw members, said ledges being formed to engage said slot, spring means for urging said jaws to outward position and slidable collar means carried by said mounting member for engaging the outside of said jaws and urging the same to inward closed position.

2. In a closing tool, a body member, a continuous peripheral mounting slot formed in said body member, jaw members about said body member, lip means on said jaw members for engaging and crimping a cap skirt and laterally extending ledge means on said jaw members, said ledge means being of substantial thickness and being substantially coextensive with the width of said jaw members, said ledge means being slidably mounted in said body member slot for mounting said jaw members for radial to and fro movement, whereby a rugged but readily movable mounting is provided, said ledge means being spaced from said lip means, means engaging the base of said slot and said ledge means to slidably expand said jaw members, means acting on said jaw members and body member for imparting a slidable contracting movement to said jaw members and positive stop means engaging said jaw members between said ledge and lip means to stop the contraction of said jaw members at a predetermined point.

3. A tool for applying seal caps to container closures, comprising a circular mounting member, a sealing member comprising a plurality of jaw members and means for mounting said sealing member on said mounting member comprising a circular, peripheral slot having rigid side walls parallel throughout formed in said mounting member and projecting ledge means formed on said jaw members, said ledge means being of substantial length with respect to the width of said jaw members and being received in said slot for mounting said jaw members about said mounting member for movement of said sealing member elements from open position to closed sealing position, said mounting member extending downwardly below said slot in opposed relation to the inner face of said jaw members to engage the same on predetermined contracting movement thereof and act as a positive stop against too great contraction, resilient means engaging said jaw members above the stop engaging position thereof for urging said jaw members to expanded position and means carried by said mounting member and engaging said jaw members for moving the same to contracted position.

4. A tool for applying seal caps to container closures, comprising a circular body member having a circular, peripheral slot formed therearound, jaw members having lip means for engaging and crimping a cap skirt and ledge means for mounting said jaw members on said body member, said lip means and ledge means being spaced from one another, said ledge means being received in said peripheral slot for mounting said jaw members about said body member for contracting and expanding movement, said body member having a portion extending below said peripheral slot and engaging said jaw members on predetermined contracting movement of the same to act as a positive stop to prevent undue contraction of said jaw members, resilient means engaging said jaw members above the stop engaging position thereof to urge said jaw members into expanded position and means movably carried by said body member and engaging said jaw members on the outside thereof to force said jaw members into contracting position.

5. In a tool for applying seal caps to container closures, an elongated tubular body member having a peripheral slot formed therearound, a closing member comprising a plurality of closing member elements mounted for radial movement from expanded to contracted position about said body member by means of said peripheral slot, means for moving said closing member to contracted position carried by said body member, said last-named means having a portion slidable on said body member and another portion engaging said closing member elements for actuating the same, the portion of said tubular body member below said peripheral slot being of reduced diameter from the rest of said tubular body member and said reduced portion being engaged by said closing member elements on predetermined contraction of the same to act as a positive stop to prevent damaging contraction of said closing member elements.

RICHARD H. MELRATH.